(12) United States Patent
Arano et al.

(10) Patent No.: US 10,827,114 B2
(45) Date of Patent: Nov. 3, 2020

(54) IMAGING SYSTEM AND SETTING DEVICE

(71) Applicant: OMRON Corporation, Kyoto (JP)

(72) Inventors: Tomohiro Arano, Kusatsu (JP); Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/562,391

(22) Filed: Sep. 5, 2019

(65) Prior Publication Data
US 2020/0112687 A1 Apr. 9, 2020

(30) Foreign Application Priority Data

Oct. 9, 2018 (JP) ................. 2018-190941

(51) Int. Cl.
*H04N 5/232* (2006.01)
*G06T 7/00* (2017.01)

(52) U.S. Cl.
CPC ..... *H04N 5/232127* (2018.08); *G06T 7/0004* (2013.01); *H04N 5/23216* (2013.01); *H04N 5/232125* (2018.08); *H04N 5/232939* (2018.08); *G06T 2207/30164* (2013.01)

(58) Field of Classification Search
None
See application file for complete search history.

(56) References Cited

U.S. PATENT DOCUMENTS 9,241,106 B2 * 1/2016 Kiuchi ................. H04N 5/2351

FOREIGN PATENT DOCUMENTS

JP 2018084701 5/2018

* cited by examiner

*Primary Examiner* — Mark T Monk
(74) *Attorney, Agent, or Firm* — JCIPRNET

(57) ABSTRACT

An imaging system capable of stably focusing on a desired location on a subject is provided. An imaging system includes a setting part that sets a search range of an auto-focus part in a predetermined range according to an input to an input device. The setting part causes a display device to display a figure indicating a relationship between a focal position of an optical system and an evaluation value indicating an in-focus degree, and an image indicated by an image signal when the optical system has been adjusted to a focal position designated on a figure to support an input of the search range to the input device.

12 Claims, 11 Drawing Sheets

IMAGING SYSTEM AND SETTING DEVICE

CROSS-REFERENCE TO RELATED APPLICATION

This application claims the priority of Japan patent application serial no. 2018-190941, filed on Oct. 9, 2018. The entirety of the above-mentioned patent application is hereby incorporated by reference herein and made a part of this specification.

BACKGROUND

Technical Field

The disclosure relates to an imaging system and a setting device.

Description of Related Art

Generally, an autofocus function of determining a focusing state and moving a focus lens of an optical system to focus on a subject is known in the field of cameras. For example, Japanese Patent Laid-Open No. 2018-84701 (Patent Document 1) discloses a focus adjustment device that limits a range in which a focus lens is moved, to a limited range.

For example, in an industrial instrument that allows inspection of a subject, it is desirable to obtain an image is in focus at the subject for accurate inspection. A plurality of locations on the subject is likely to be brought into focus according to a shape or the transparency of the subject. In such a case, it is necessary to obtain an image which is in focus at a desired inspection target location among a plurality of locations.

In the technology described in Patent Document 1, it is possible to set a limited range in which the focus lens is moved. However, it has been difficult for a worker to set an appropriate limited range according to an inspection target location of the subject. Therefore, it is not possible to stably obtain an image which is in focus at an inspection target location.

SUMMARY

The disclosure provides an imaging system and a setting device capable of stably focusing on a desired location on a subject.

According to an embodiment of the disclosure, an imaging system includes an optical system, an imaging element, a calculation part, an autofocus part, an input device, a setting part, and a display device. The focal position of the optical system is variable in a predetermined range. The imaging element generates an image signal by receiving light from a subject via the optical system. The calculation part calculates an evaluation value indicating an in-focus degree based on the image signal. The autofocus part searches for a focal position at which the subject is in-focus based on the evaluation value. The setting part sets a search range of the autofocus part in the predetermined range according to an input to the input device. The setting part supports an input of the search range to the input device by causing the display device to display a figure indicating a relationship between the focal position of the optical system and the evaluation value, and an image indicated by the image signal when the focal position of the optical system has been adjusted to a position designated on the figure.

BRIEF DESCRIPTION I/F THE DRAWINGS

DESCRIPTION OF THE EMBODIMENTS

Figure 1:
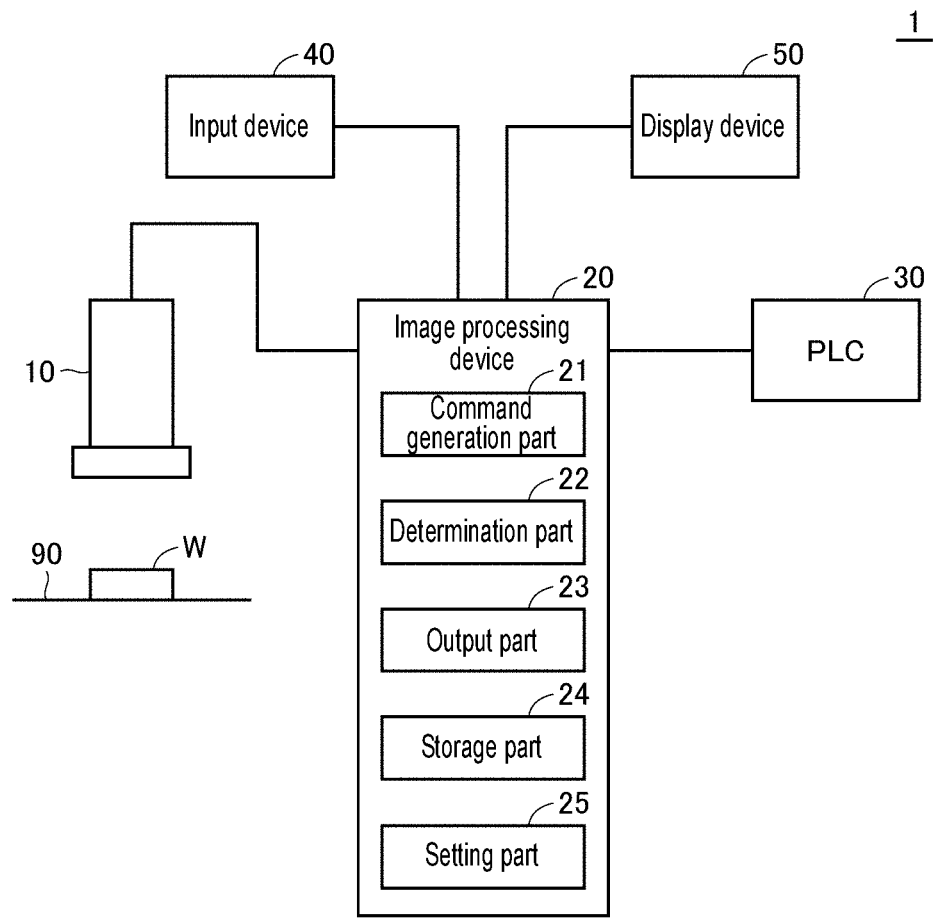
FIG. 1 is a schematic diagram illustrating an application example of an imaging system according to an embodiment.

Hereinafter, embodiments according to the disclosure will be described with reference to the drawings. In the following description, parts and components which are the same are denoted by the same reference numerals. Names and functions thereof are also the same. Therefore, detailed description of these will not be repeated.

1. Application Example

Figure 2:
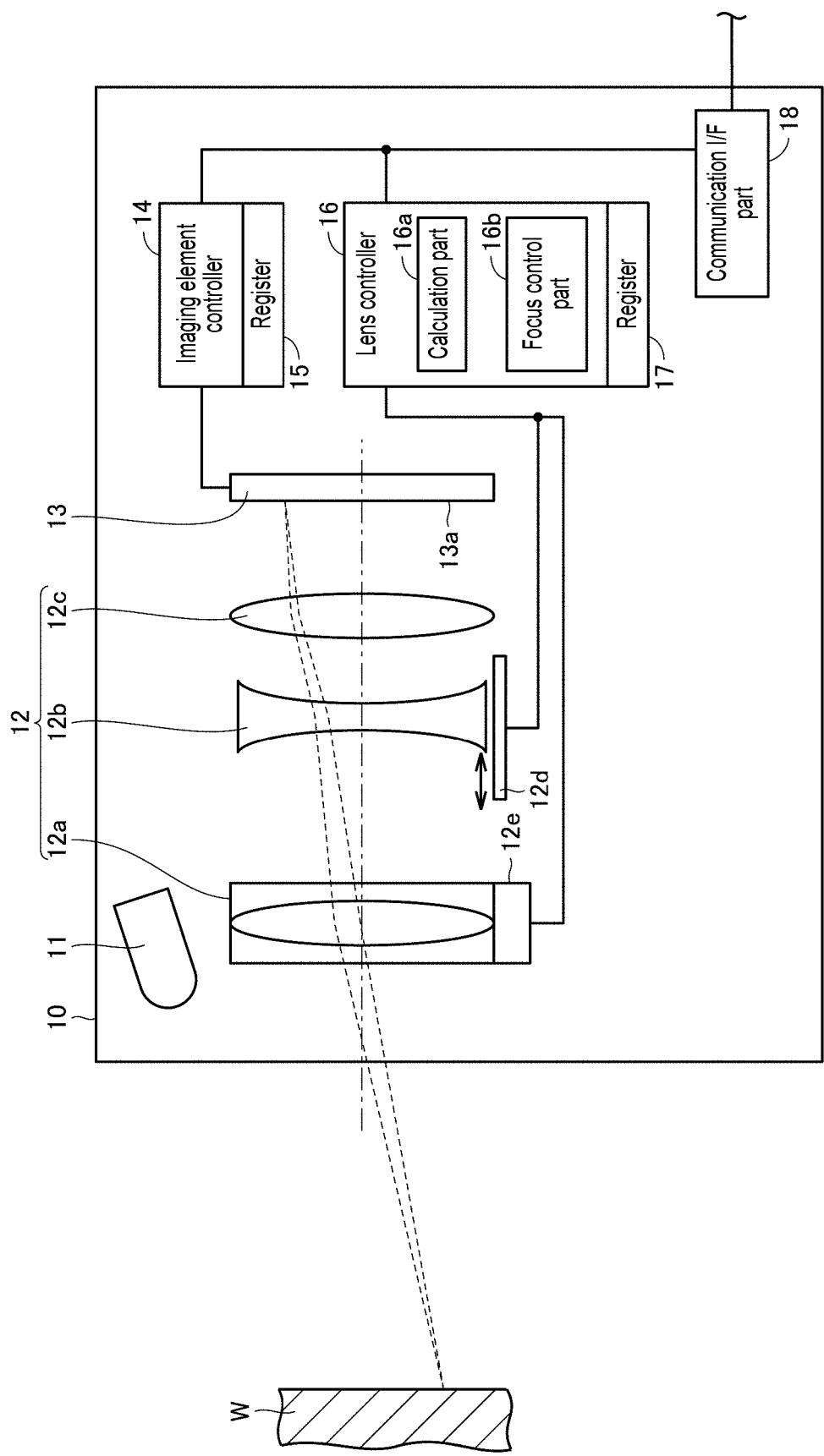
FIG. 2 is a diagram illustrating an example of an internal configuration of an imaging device provided in the imaging system.

First, an example of a scene to which the disclosure is applied will be described with reference to FIGS. 1 and 2. FIG. 1 is a schematic diagram illustrating one application example of an imaging system according to the embodiment. FIG. 2 is a diagram illustrating an example of an internal configuration of an imaging device included in the imaging system.

As illustrated in FIG. 1, the imaging system 1 according to the embodiment is realized, for example, as an appearance inspection system. The appearance inspection system images an inspection target location on a workpiece W placed on a stage 90 and performs an appearance inspection of the workpiece W using the image, for example, in a production line of an industrial product. In the appearance inspection, scratches, dirt, the presence or absence of foreign matter on, dimensions, and the like of the workpiece W are inspected for.

When the appearance inspection of the workpiece W placed on the stage 90 is completed, a next workpiece (not illustrated) is transported onto the stage 90. At the time of imaging of the workpiece W, the workpiece W may be stationary in a predetermined posture at a predetermined position on the stage 90. Alternatively, the workpiece W may be imaged while the workpiece W moves on the stage 90.

As illustrated in FIG. 1, the imaging system 1 includes an imaging device 10, an image processing device 20, an input device 40, and a display device 50 as basic components. In this embodiment, the imaging system 1 further includes a programmable logic controller (PLC) 30.

The imaging device 10 is connected to the image processing device 20. The imaging device 10 images a subject (the workpiece W) present in an imaging field of view according to an instruction from the image processing device 20, and generates image data including an image of the workpiece W. In the embodiment, the imaging device 10 is an imaging system having an autofocus function. The imaging device 10 and the image processing device 20 may be integrated.

As illustrated in FIG. 2, the imaging device 10 includes an illumination part 11, a lens module 12, an imaging element 13, an imaging element controller 14, a lens controller 16, registers 15 and 17, and a communication I/F part 18.

The illumination part 11 emits light to the workpiece W. The light emitted from the illumination part 11 is reflected by the workpiece W and is incident on the lens module 12. The illumination part 11 may be omitted.

The lens module 12 is an optical system for forming an image of the light from the workpiece W on an imaging surface 13a of the imaging element 13. A focal position of the lens module 12 is variable in a predetermined movable range. The focal position is a position of a point at which an incident ray parallel to the optical axis intersects the optical axis.

The lens module 12 includes a lens 12a, a lens group 12b, a lens 12c, a movable part 12d, and a focus adjustment part 12e. The lens 12a is a lens for changing the focal position of the lens module 12. The focus adjustment part 12e controls the lens 12a such that the focal position of the lens module 12 is changed.

The lens group 12b is a lens group for changing a focal length. A zoom magnification is controlled by changing the focal length. The lens group 12b is disposed in the movable part 12d and is movable in an optical axis direction. The lens 12c is a lens fixed at a predetermined position in the imaging device 10.

The imaging element 13 is, for example, a photoelectric conversion element such as a complementary metal oxide semiconductor (CMOS) image sensor, and generates an image signal by receiving the light from the workpiece W via the lens module 12.

When the imaging element controller 14 generates image data based on the image signal from the imaging element 13, the imaging element controller 14 opens and closes a shutter for a preset shutter speed (exposure time) and generates image data with a preset resolution. Information indicating the shutter speed and the resolution is stored in the register 15 in advance.

The lens controller 16 adjusts a focus of the imaging device 10 according to a command stored in the register 17. As illustrated in FIG. 2, the lens controller 16 includes a calculation part 16a and a focus controller 16b.

The calculation part 16a calculates an evaluation value indicating the in-focus degree from the image data generated by the imaging element controller 14. For example, the calculation part 16a extracts high frequency components by applying a high pass filter to the image data, and calculates an integrated value of the extracted high frequency components as the evaluation value. Such an evaluation value corresponds to the amount of edge component in the image and is obtained by converting a contrast of the image into a numerical value. The contrast of the image changes according to the in-focus degree, and the in-focus degree decreases as the contrast decreases.

The focus controller 16b changes the focal position of the lens module 12 to control the in-focus degree of the workpiece W. The focus controller 16b has an auto focus mode, a setting mode, and a manual focus mode.

In the autofocus mode, the focus controller 16b acquires the evaluation value while changing the focal position of the lens module 12 in the search range, and searches for a focal position at which the workpiece W is in focus (hereinafter referred to an "in-focus position"), based on the acquired evaluation value. "In-focus" means that the image of the workpiece W is formed on the imaging surface 13a of the imaging element 13. The search range is a part of the movable range of the focal position of the lens module 12, and is set by the image processing device 20 in advance. Information indicating a search range (hereinafter referred to as "search range information") is stored in the register 17 in advance. The focus controller 16b changes the focal position of the lens module 12 by controlling the focus adjustment part 12e. The focus controller 16b searches for a focal position at which the evaluation value is maximized as the in-focus position.

In the setting mode, the focus controller 16b changes the focal position of the lens module 12 by predetermined intervals (step intervals) in the movable range and acquires an evaluation value at each position. The focus controller 16b generates information indicating a correspondence relationship between each focal position in the movable range and the evaluation value (hereinafter referred to as "evaluation value information"). Information indicating the movable range is stored in the register 17 in advance.

In the manual focus mode, the focus controller 16b adjusts the focal position of the lens module 12 to a designated position (hereinafter referred to as "designated position").

The lens controller 16 may adjust a position of the lens group 12b by controlling the movable part 12d so that a size of an area included in an imaging field of view of the workpiece W is substantially constant. In other words, the lens controller 16 can control the movable part 12d such that the size of the area included in the imaging field of view of the workpiece W is in a predetermined range. The lens controller 16 may adjust the position of the lens group 12b according to a distance between the imaging position and the workpiece W. In this embodiment, zoom adjustment is not essential.

The communication I/F part 18 transmits and receives data to and from the image processing device 20. The communication I/F part 18 receives an autofocus mode imaging instruction, a setting mode imaging instruction, and a manual focus mode imaging instruction from the image processing device 20.

When the autofocus mode imaging instruction is received, the communication I/F part 18 transmits the image data generated by the imaging element controller 14 when the focal position of the lens module 12 has been adjusted to the in-focus position to the image processing device 20.

When the setting mode imaging instruction is received, the communication I/F part 18 transmits the evaluation value information generated by the focus controller 16b to the image processing device 20.

When the manual focus mode imaging instruction is received, the communication I/F part 18 transmits the image data generated by the imaging element controller 14 when the focal position of the lens module 12 has been adjusted to the designated position to the image processing device 20.

Referring back to FIG. 1, the image processing device 20 acquires the image of the workpiece W from the imaging device 10. The image processing device 20 executes a predetermined process for the image. Further, the image processing device 20 also operates as a setting device that sets a search range in the autofocus mode. The image processing device 20 includes a command generation part 21, a determination part 22, an output part 23, a storage part 24, and a setting part 25.

The command generation part 21 receives a control command from the PLC 30, and outputs an autofocus mode imaging instruction to the imaging device 10. Further, the command generation part 21 receives a command from the setting part 25 and outputs the setting mode imaging instruction or the manual focus mode imaging instruction to the imaging device 10.

The determination part 22 determines whether or not the appearance of the workpiece W is good by executing a predetermined process for the image data generated by the imaging device 10. The determination part 22 sets the image data acquired from the imaging device 10 in response to the autofocus mode imaging instruction as a processing target. The output part 23 outputs a determination result of the determination part 22. For example, the output part 23 causes the display device 50 to display the determination result.

The storage part 24 stores various pieces of data, programs, and the like. For example, the storage part 24 stores the image data acquired from the imaging device 10 and the image data subjected to predetermined processing. The storage part 24 may store the determination result of the determination part 22. Further, the storage part 24 stores a program for causing the image processing device 20 to execute various processes.

The setting part 25 sets a search range of the in-focus position in the autofocus mode according to an input to the input device 40.

When a search range setting instruction is input to the input device 40, the setting part 25 causes the command generation part 21 to output the manual focus mode imaging instruction from the command generation part 21 and acquires the evaluation value information from the imaging device 10. The setting part 25 causes the display device 50 to display a figure indicating a relationship between the focal position of the lens module 12 and the evaluation value based on the acquired evaluation value information.

Further, when the setting part 25 causes the command generation part 21 to output the manual focus mode imaging instruction in which the focal position designated in the figure is the designated position, and acquires image data when the focal position of the lens module 12 has been adjusted to the designated position. The setting part 25 causes the display device 50 to display the image represented by the acquired image data together with the figure. Accordingly, the setting part 25 supports an input of the search range to the input device 40.

By receiving the support of the setting part 25, a worker can easily set a search range for obtaining an image which is in focus at the inspection target location of the workpiece W. As a result, it is possible to cause the inspection target location of the workpiece W to be stably in focus.

The input device 40 includes, for example, a keyboard, a mouse, a touch panel, a dedicated console, and receives an input from the worker.

The display device 50 includes, for example, a liquid crystal display, and displays the search range setting screen and a screen indicating a result of image processing of the workpiece W (for example, a result of determining whether or not an appearance of a product is good).

The PLC 30 controls the image processing device 20. For example, the PLC 30 controls a timing at which the image processing device 20 outputs the autofocus mode imaging instruction to the imaging device 10.

2. Specific Example

<A. Configuration Example for Searching for in-Focus Position>

Figure 3:
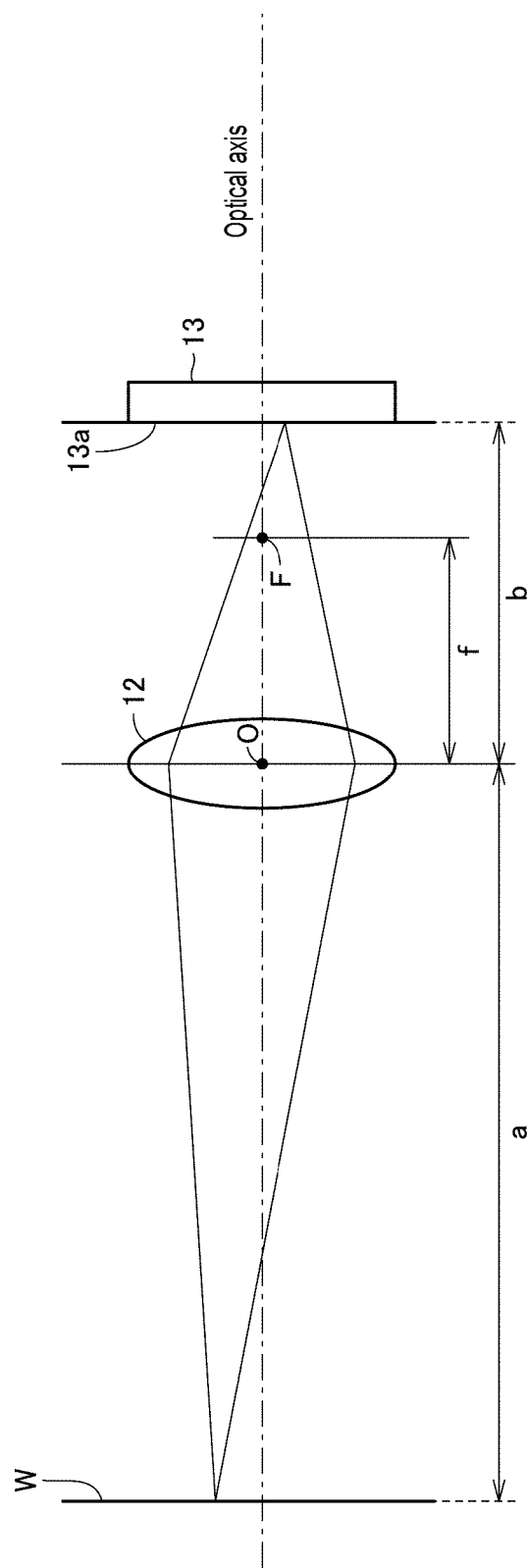
FIG. 3 is a schematic diagram illustrating searching for an in-focus position.

FIG. 3 is a schematic diagram illustrating the search of an in-focus position. In order to simplify the description, only one lens of the lens module 12 is illustrated in FIG. 3.

As illustrated in FIG. 3, a distance from a principal point 0 of the lens module 12 to a target surface (a surface of the inspection target location in the workpiece W) is a, and a distance from the principal point 0 of the lens module 12 to an imaging surface 13a is b, and a distance (a focal length) from the principal point 0 of the lens module 12 to the focal position (a rear focal position) F of the lens module 12 is f. When an image of the inspection target location of the workpiece W is formed at a position of the imaging surface 13a, the following Equation (1) is established.

$$1/a + 1/b = 1/f \qquad (1)$$

That is, when Equation (1) is established, it is possible to capture an image which is in focus at the inspection target location of the workpiece W.

The distance between the imaging surface 13a and the inspection target location may change according to a height of the inspection target location of the workpiece W. The focal position F of the lens module 12 is adjusted by controlling the lens 12a to obtain the image which is in focus at the inspection target even when the distance between the imaging surface 13a and the inspection target location has changed. Methods of adjusting the focal position F of the lens module 12 by controlling the lens 12a include a method (A) and a method (B) below.

The method (A) is a method of moving at least one lens (for example, the lens 12a) constituting the lens module 12 in parallel in the optical axis direction. According to method (A), the principal point 0 of the lens module 12 moves in the optical axis direction, and the focal position F changes. As a result, the distance b changes. The focal position F corresponding to the distance b satisfying Equation (1) is searched for as the in-focus position.

Method (B) is a method of changing a refraction direction of the lens 12a fixed at a regular position. According to the method (B), the focal position F changes as the focal length f of the lens module 12 changes. The focal position F corresponding to the focal length f satisfying Equation (1) is searched for as the in-focus position.

As described above, the focus controller 16b has the autofocus mode. In the autofocus mode, the focus controller 16b acquires the evaluation value while changing the focal position F of the lens module 12, and searches for the focal position F at which the evaluation value is maximized, as the in-focus position. A configuration of the lens 12a for changing the focal position F of the lens module 12 is not particularly limited. Hereinafter, an example of the configuration of the lens 12a will be described.

Figure 4:
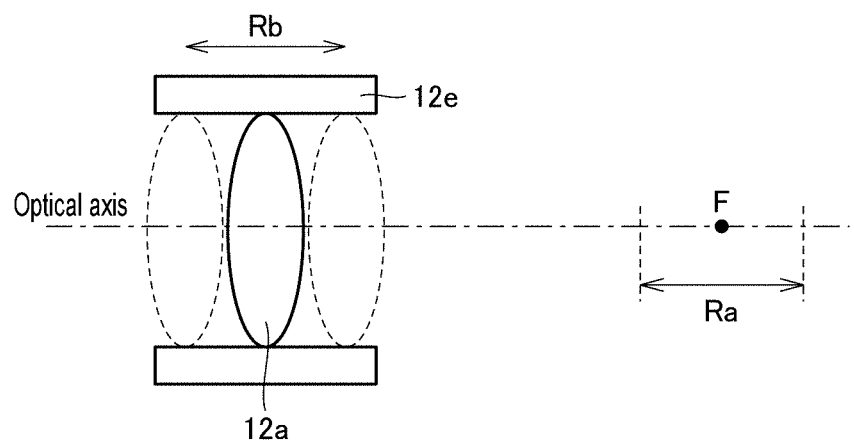
FIG. 4 is a diagram illustrating an example of a configuration of a lens for changing a focal position of a lens module.

FIG. 4 is a diagram illustrating an example of a configuration of the lens module 12 for changing the focal position of the lens module. In the example illustrated in FIG. 4, the lens 12a constituting the lens module 12 is moved in parallel. However, at least one lens (at least one of the lens 12a, the lens group 12b, and the lens 12c) constituting the lens module 12 may be moved in parallel.

By using the lens 12a having the configuration illustrated in FIG. 4, the focal position F of the lens module 12 is changed according to the above method (A). That is, in the configuration illustrated in FIG. 4, the focus adjustment part 12e moves the lens 12a in the optical axis direction. By moving the position of the lens 12a, the focal position F of the lens module 12 is changed. A movable range Ra of the focal position F corresponds to a movable range Rb of the lens 12a.

The focus controller 16b adjusts the focal position F of the lens module 12 by controlling the moving amount of the lens 12a. The moving amount of the lens 12a is represented by a distance from a reference position (for example, a position of one end of the movable range Rb) to the lens 12a.

When the autofocus mode imaging instruction is received, the focus controller 16b acquires the evaluation value when the moving amount of the lens 12a has been changed, and searches for the focal position F corresponding to the moving amount of the lens 12a at which the evaluation value is maximized, as the in-focus position.

When the setting mode imaging instruction is received, the focus controller 16b changes the focal position F of the lens module 12 in the entire movable range Ra by changing the lens 12a from the one end to the other end of the movable range Rb by predetermined intervals. The focus controller 16b generates evaluation value information in which the moving amount of the lens 12a is associated with the evaluation value.

When the manual focus mode imaging instruction is received, the focus controller 16b moves the lens 12a by the moving amount corresponding to the designated position.

In FIG. 3, an example of one lens 12a is shown. Usually, a lens for focus adjustment is often configured using a plurality of combined lenses. However, also in the combined lens, the focal position F of the lens module 12 can be changed by controlling the moving amount of at least one lens constituting the combined lens.

Figure 5:
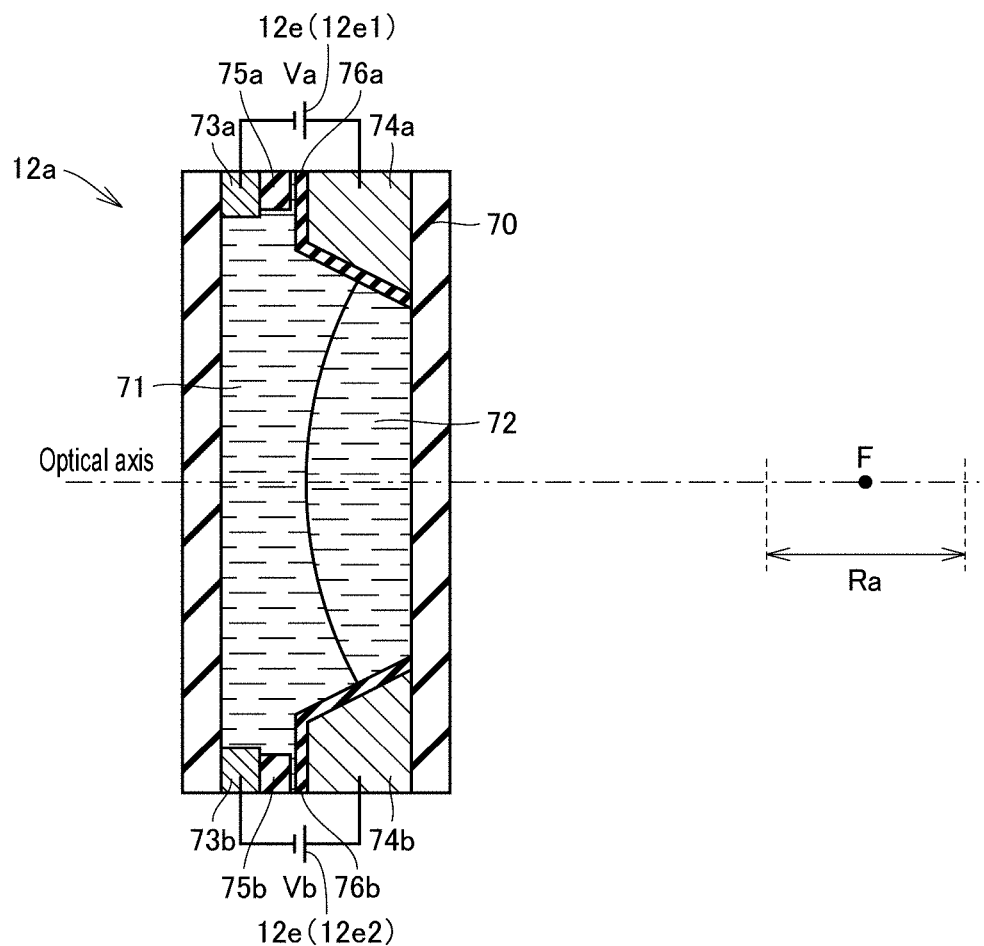
FIG. 5 is a diagram illustrating another example of the configuration of the lens for changing the focal position of the lens module.

FIG. 5 is a diagram illustrating another example of the configuration of the lens 12a for changing the focal position of the lens module. By using the lens 12a having the configuration illustrated in FIG. 5, the focal position F of the lens module 12 is changed according to the method (B) described above.

The lens 12a illustrated in FIG. 5 is a liquid lens. The lens 12a includes a transparent container 70, electrodes 73a, 73b, 74a, and 74b, insulators 75a and 75b, and insulating layers 76a and 76b.

A sealed space in the transparent container 70 is filled with a conductive liquid 71 such as water and an insulating liquid 72 such as an oil. The conductive liquid 71 and the insulating liquid 72 do not mix and have different refractive indices.

The electrodes 73a and 73b are respectively fixed between the insulators 75a and 75b and the transparent container 70, and are located in the conductive liquid 71.

The electrodes 74a and 74b are disposed near an end portion of an interface between the conductive liquid 71 and the insulating liquid 72. The insulating layer 76a is interposed between the electrode 74a, and the conductive liquid 71 and the insulating liquid 72. The insulating layer 76b is interposed between the electrode 74b, and the conductive liquid 71 and the insulating liquid 72. The electrode 74a and the electrode 74b are disposed at positions symmetrical with respect to an optical axis of the lens 12a.

In the configuration illustrated in FIG. 5, the focus adjustment part 12e includes a voltage source 12e1 and a voltage source 12e2. The voltage source 12e1 applies a voltage Va between the electrode 74a and the electrode 73a. The voltage source 12e2 applies a voltage Vb between the electrode 74b and the electrode 73b.

When the voltage Va is applied between the electrode 74a and the electrode 73a, the conductive liquid 71 is pulled by the electrode 74a. Similarly, when the voltage Vb is applied between the electrode 74b and the electrode 73b, the conductive liquid 71 is pulled by the electrode 74b. Accordingly, a curvature of the interface between the conductive liquid 71 and the insulating liquid 72 changes. Since the conductive liquid 71 and the insulating liquid 72 have different refractive indices, the curvature of the interface between the conductive liquid 71 and the insulating liquid 72 changes, and therefore, the focal position F of the lens module 12 changes.

The curvature of the interface between the conductive liquid 71 and the insulating liquid 72 depends on magnitudes of the voltages Va and Vb. Therefore, the focus controller 16b changes the focal position F of the lens module 12 by controlling the magnitudes of the voltages Va and Vb. The movable range Ra of the focal position F is determined by a voltage range of the voltages Va and Vb.

When the autofocus mode imaging instruction is received, the focus controller 16b acquires the evaluation value when the magnitudes of the voltages Va and Vb have been changed, and searches for the focal position F corresponding to the magnitudes of the voltages Va and Vb at which the evaluation value is maximized, as the in-focus position.

When the setting mode imaging instruction is received, the focus controller 16b changes the magnitudes of the voltages Va and Vb from a minimum value to a maximum value by predetermined intervals to change the focal position F of the lens module 12 in the entire movable range Ra. The focus controller 16b generates evaluation value information in which the magnitudes of the voltages Va and Vb are associated with the evaluation value.

When the manual focus mode imaging instruction is received, the focus controller 16b applies voltages Va and Vb having magnitudes corresponding to the designated position to the lens 12a.

Normally, the voltage Va and the voltage Vb are controlled such that the voltages have the same value. Accordingly, the interface between the conductive liquid 71 and the insulating liquid 72 changes symmetrically with respect to the optical axis. However, the voltage Va and the voltage Vb may be controlled such that the voltages have different values. Accordingly, the interface between the conductive liquid 71 and the insulating liquid 72 becomes asymmetric with respect to the optical axis such that a direction of an imaging field of view of the imaging device 10 can be changed.

Further, a liquid lens and a solid lens may be combined. In this case, the focal position F of the lens module 12 is changed using both the method (A) and the method (B)

described above, and the focal position F when Equation (1) is satisfied is searched for as the in-focus position.

<B. Hardware Configuration of Image Processing Device>

Figure 6:
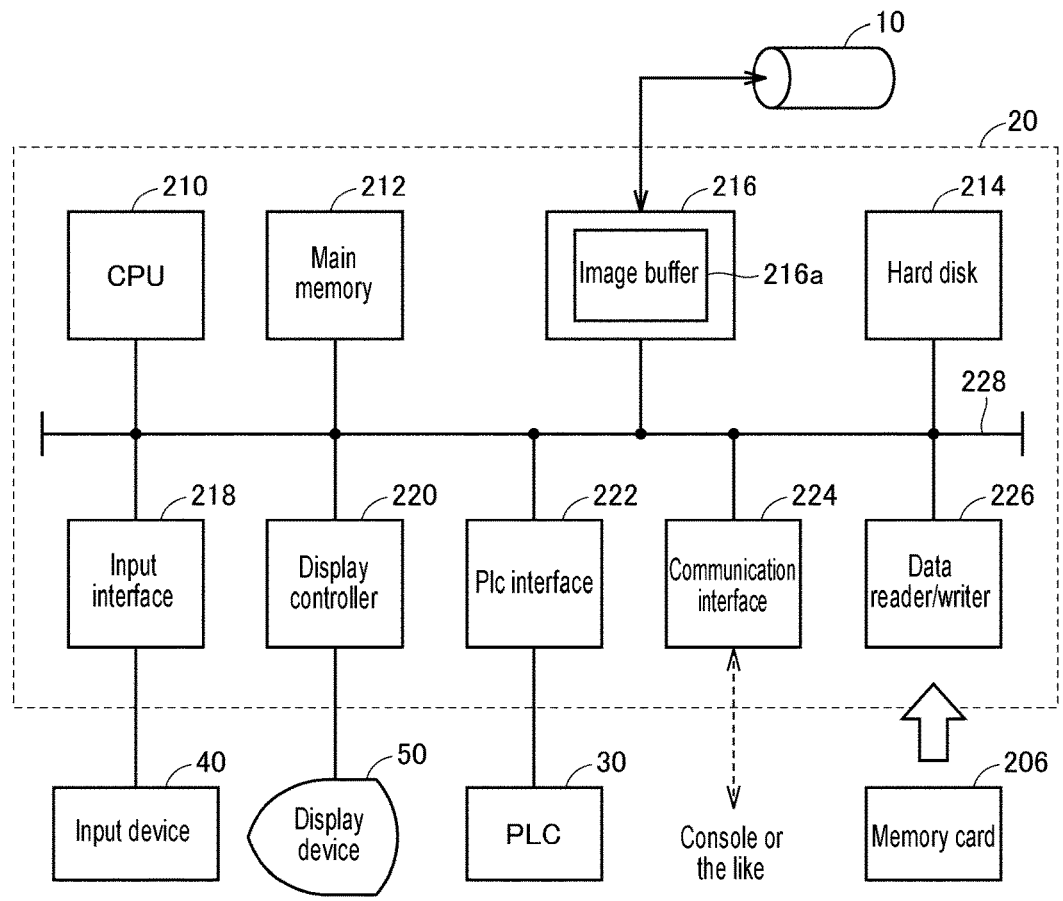
FIG. 6 is a block diagram illustrating an example of a hardware configuration of an image processing device according to the embodiment.

FIG. 6 is a block diagram illustrating an example of a hardware configuration of the image processing device according to the embodiment. The image processing device 20 of the example illustrated in FIG. 6 includes a central processing unit (CPU) 210 that is an arithmetic processing part, a main memory 212 and a hard disk 214 as storage parts, a camera interface 216, an input interface 218, a display controller 220, a PLC interface 222, a communication interface 224, and data reader/writer 226. These parts are connected to each other via a path 228 so that data communication can be performed.

The CPU 210 develops programs (codes) stored in the hard disk 214 in the main memory 212 and executes the programs in a predetermined order to perform various computations. The command generation part 21, the determination part 22, and the setting part 25 illustrated in FIG. 1 are realized by the CPU 210 performing various computations. The main memory 212 is typically a volatile storage device such as a dynamic random access memory (DRAM), and holds the image data acquired by the imaging device 10, work data, and the like, in addition to the programs read from the hard disk 214. Further, various setting values or the like may be stored in the hard disk 214. The storage part 24 illustrated in FIG. 1 includes the main memory 212 and the hard disk 214. In addition to or instead of the hard disk 214, a semiconductor storage device such as a flash memory may be adopted.

The camera interface 216 mediates data transfer between the CPU 210 and the imaging device 10. That is, the camera interface 216 is connected to the imaging device 10 for imaging the workpiece W to generate image data. More specifically, the camera interface 216 includes an image buffer 216a for temporarily storing the image data from the imaging device 10. When the image data with a predetermined number of frames is stored in the image buffer 216a, the camera interface 216 transfers the stored data to the main memory 212. Further, the camera interface 216 sends the imaging instruction or the information indicating the search range to the imaging device 10 according to an internal command generated by the CPU 210.

The input interface 218 mediates data transfer between the CPU 210 and the input device 40. That is, the input interface 218 receives an operation command given by the worker operating the input device 40.

The display controller 220 is connected to the display device 50, and notifies the user of a processing result in the CPU 210 or the like. That is, the display controller 220 controls the screen of the display device 50. The output part 23 illustrated in FIG. 1 is configured using the display controller 220.

The PLC interface 222 mediates data transfer between the CPU 210 and the PLC 30. More specifically, the PLC interface 222 transfers a control command from PLC 30 to the CPU 210.

The communication interface 224 mediates data transfer between the CPU 210 and a console (or a personal computer or a server device) or the like. The communication interface 224 is typically made of Ethernet (registered trademark), USB (Universal Serial Bus), or the like. As will described below, a program downloaded from a distribution server or the like may be installed in the image processing device 20 via the communication interface 224, instead of the program stored in the memory card 206 being installed in the image processing device 20.

The data reader/writer 226 mediates data transfer between the CPU 210 and the memory card 206, which is a recording medium. That is, the memory card 206 is distributed in a state in which a program to be executed by the image processing device 20 or the like is stored, and the data reader/writer 226 reads the program from the memory card 206. Further, the data reader/writer 226 writes, for example, the image data acquired by the imaging device 10 and/or a processing result in the image processing device 20 to the memory card 206 in response to an internal command of the CPU 210. The memory card 206 includes a general-purpose semiconductor storage device such as a Secure Digital (SD), a magnetic storage medium such as a flexible disk, an optical storage medium such as a compact disk read only memory (CD-ROM), or the like.

<C. Example of Workpiece and Problem of Autofocus>

Figure 7:
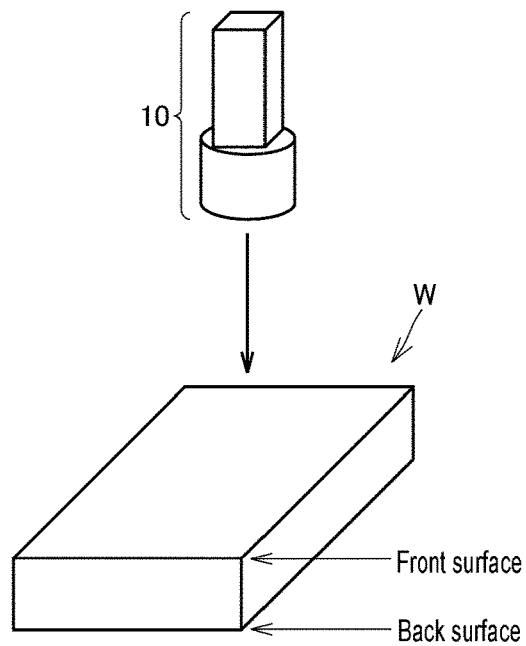
FIG. 7 is a diagram schematically illustrating imaging of a workpiece by the imaging device.

FIG. 7 is a diagram schematically illustrating imaging of the workpiece W by the imaging device. The workpiece W in the example illustrated in FIG. 7 is a transparent body (glass or the like). When the in-focus position is searched for from the entire movable range of the focal position of the lens module 12, an image which is in focus at a front surface of the workpiece W may be obtained and an image which is in focus at a back surface of the workpiece W may be obtained. Therefore, although the front surface of the workpiece W is desired to be inspected, the image which is in focus at the back surface of the workpiece W may be obtained. On the other hand, although the back surface of the workpiece W is desired to be inspected, the image which is in focus at the front surface of the workpiece W may be obtained.

Thus, when there is a plurality of easy-to-focus locations in the workpiece W, a size problem occurs when the in-focus location is not stable due to factors such as an individual difference between the workpieces W. In order to solve such a problem, the imaging system 1 according to the embodiment sets the search range of the in-focus position in the autofocus mode.

<D. Search Range Setting Screen>

Figure 8:
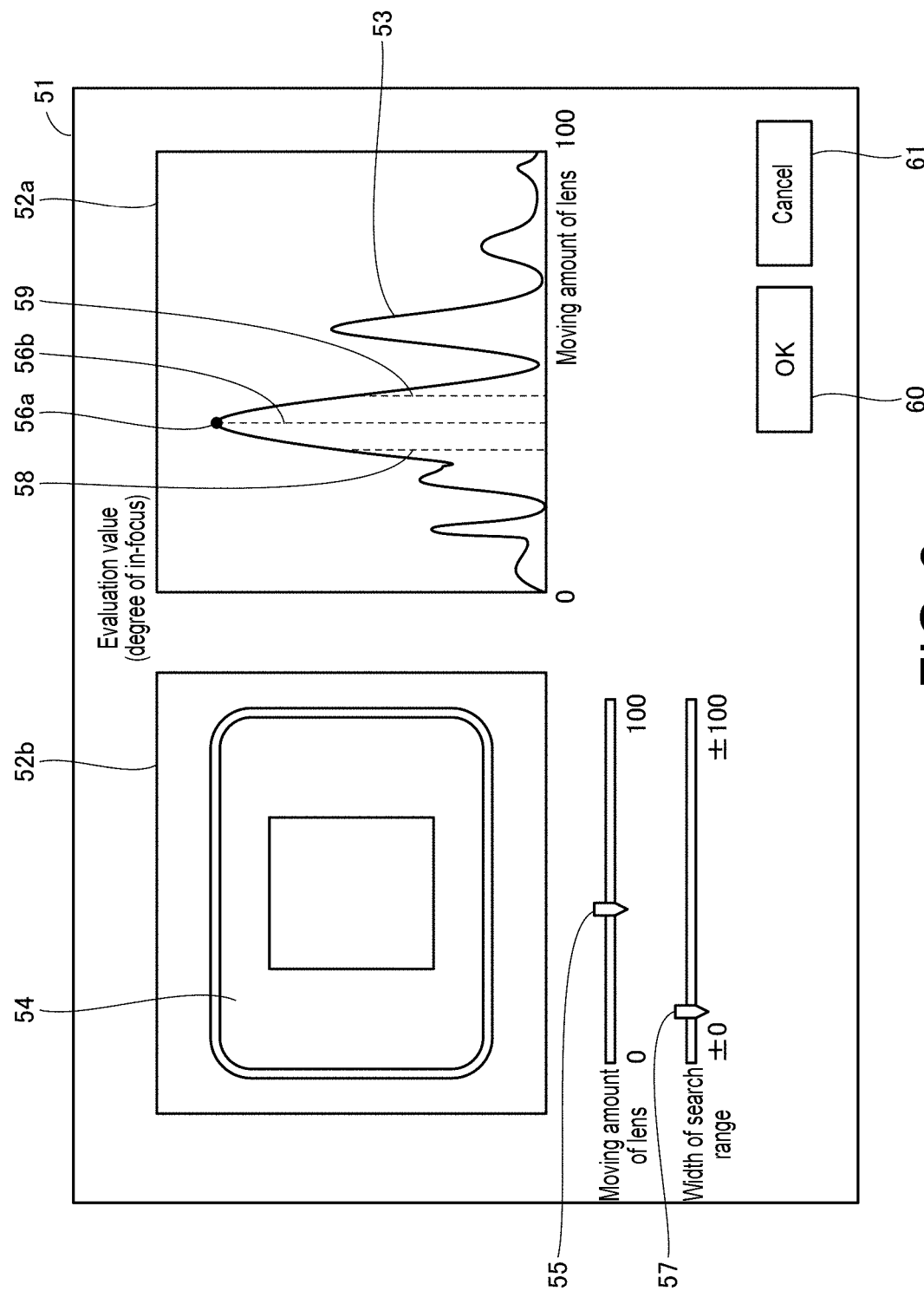
FIG. 8 is a diagram illustrating an example of a setting screen for supporting setting of a search range of an in-focus position.

FIG. 8 is a diagram illustrating an example of a setting screen for supporting a setting of the search range of the in-focus position. A setting screen 51 as illustrated in FIG. 8 is displayed on the display device 50 by the setting part 25 (see FIG. 1).

The setting screen 51 in the example illustrated in FIG. 8 includes areas 52a and 52b, knobs 55 and 57, an OK button 60, and a cancel button 61. The setting screen 51 of the example illustrated in FIG. 8 is displayed in the imaging system 1 in which the lens module 12 includes the lens 12a of the example illustrated in FIG. 4.

The setting part 25 causes a line graph 53 that is the figure indicating the relationship between the focal position of the lens module 12 and the evaluation value to be displayed in the area 52a. The setting part 25 creates the line graph 53 based on the evaluation value information acquired from the imaging device 10 by transmitting the setting mode imaging instruction to the imaging device 10. The evaluation value information is generated by changing the focal position F of the lens module 12 in the entire movable range Ra. Therefore, the line graph 53 indicates a relationship between the focal position in the entire movable range Ra and the evaluation value.

The focal position F of the lens module 12 including the lens 12a of the example illustrated in FIG. 4 changes according to the moving amount of the lens 12a. Therefore, the line graph 53 in the example illustrated in FIG. 8 shows a relationship between the moving amount of the lens 12a correlated with the focal position F of the lens module 12 and the evaluation value. In the line graph 53, a horizontal axis indicates the moving amount of the lens 12a, and a vertical axis indicates the evaluation value. In the setting screen 51, the moving amount of the lens 12a when the focal position F of the lens module 12 is one end of the movable range Ra is 0, and the moving amount of the lens 12a when the focal position F of the lens module 12 is the other end of the movable range Ra is 100.

A point 56a corresponding to a center of the search range of the in-focus position is displayed on the line graph 53, and a perpendicular line 56b from the point 56a to the horizontal axis is displayed in the area 52b. A default position of the point 56a is preset. The default position of the point 56a is, for example, a position at which the moving amount of the lens 12a is zero.

Further, in the line graph 53, a dotted line 58 indicating the moving amount of the lens 12a corresponding to a lower limit of the search range and a dotted line 59 indicating the moving amount of the lens 12a corresponding to an upper limit of the search range are displayed in a superimposed manner.

The setting part 25 causes the manual focus mode imaging instruction in which the moving amount of the lens 12a corresponding to the point 56a has been designated to be output from the command generation part 21, and acquires the image data from the imaging device 10. The image data indicates an image captured when the lens 12a has been adjusted to the moving amount corresponding to the point 56a. The setting part 25 causes the image 54 indicated by the image data to be displayed in the area 52b. Each time the position of the point 56a is changed, the setting part 25 causes the manual focus mode imaging instruction to be output from the command generation part 21 and causes the image 54 indicated by the image data corresponding to the changed point 56a to be displayed in the area 52b.

The knob 55 indicates a current position of the point 56a. The setting part 25 updates the positions of the point 56a, the perpendicular line 56b, and the dotted lines 58 and 59 in response to the operation with respect to the knob 55. The worker can change the point 56a corresponding to the center of the search range to any position on the line graph 53 by operating the knob 55 using the input device 40.

The knob 57 is intended to adjust a width of the search range of the in-focus position. The width of the search range is a difference between the moving amount of the lens 12a corresponding to the lower limit of the search range and the moving amount of the lens 12a corresponding to the upper limit of the search range. Specifically, "d" of a value "±d" (d is 0 to 100) indicated in the knob 57 indicates a difference between the moving amount corresponding to the point 56a and the moving amount corresponding to the lower limit of the search range, and indicates a difference between the moving amount corresponding to the upper limit of the search range and the moving amount corresponding to the point 56a. That is, twice the value "d" of the value "±d" indicated in the knob 57 is the width of the search range. The setting part 25 updates the positions of the dotted lines 58 and 59 in response to an operation of the knob 57. The worker can change the width of the search range around the point 56a by operating the knob 57 using the input device 40.

The OK button 60 is a button for registering a currently set search range. When the OK button 60 is operated, the setting part 25 generates search range information indicating the currently set search range. The setting part 25 sends the generated search range information to the imaging device 10 via the camera interface 216. Accordingly, in the imaging device 10, the search range information received from the image processing device 20 is stored in the register 17, and in the autofocus mode, the in-focus position is searched for from the search range indicated by the search range information.

The cancel button 61 is a button for discarding the currently set search range.

When there is a plurality of easy-to-focus locations in the workpiece W, the line graph 53 has a plurality of maximum points respectively corresponding to the plurality of locations. In general, the worker does not recognize a position of the maximum point corresponding to the inspection target location of the workpiece W. However, according to the setting screen 51 illustrated in FIG. 8, the worker can operate the knob 55 to move the point 56a to the maximum point of the line graph 53 and confirm, in the area 52a, an image when the focal position of the lens module 12 has been adjusted to a position corresponding to the maximum point. Accordingly, the worker can easily select a point when the inspection target location of the workpiece W from the line graph 53 is in focus and set a search range including the point.

Further, when a plurality of maximum points is included in the search range, the in-focus position searched for in the autofocus mode is likely to be unstable. However, according to the setting screen 51 illustrated in FIG. 8, the worker can set the width of the search range so that only one maximum point corresponding to the inspection target location is included in the search range and the other maximum points are not included, by operating the knob 57.

As described above, the worker can set the search range for stably acquiring an image which is in focus at the inspection target location of the workpiece W by using the setting screen 51.

<E. Search Range Setting Process>

Figure 9:
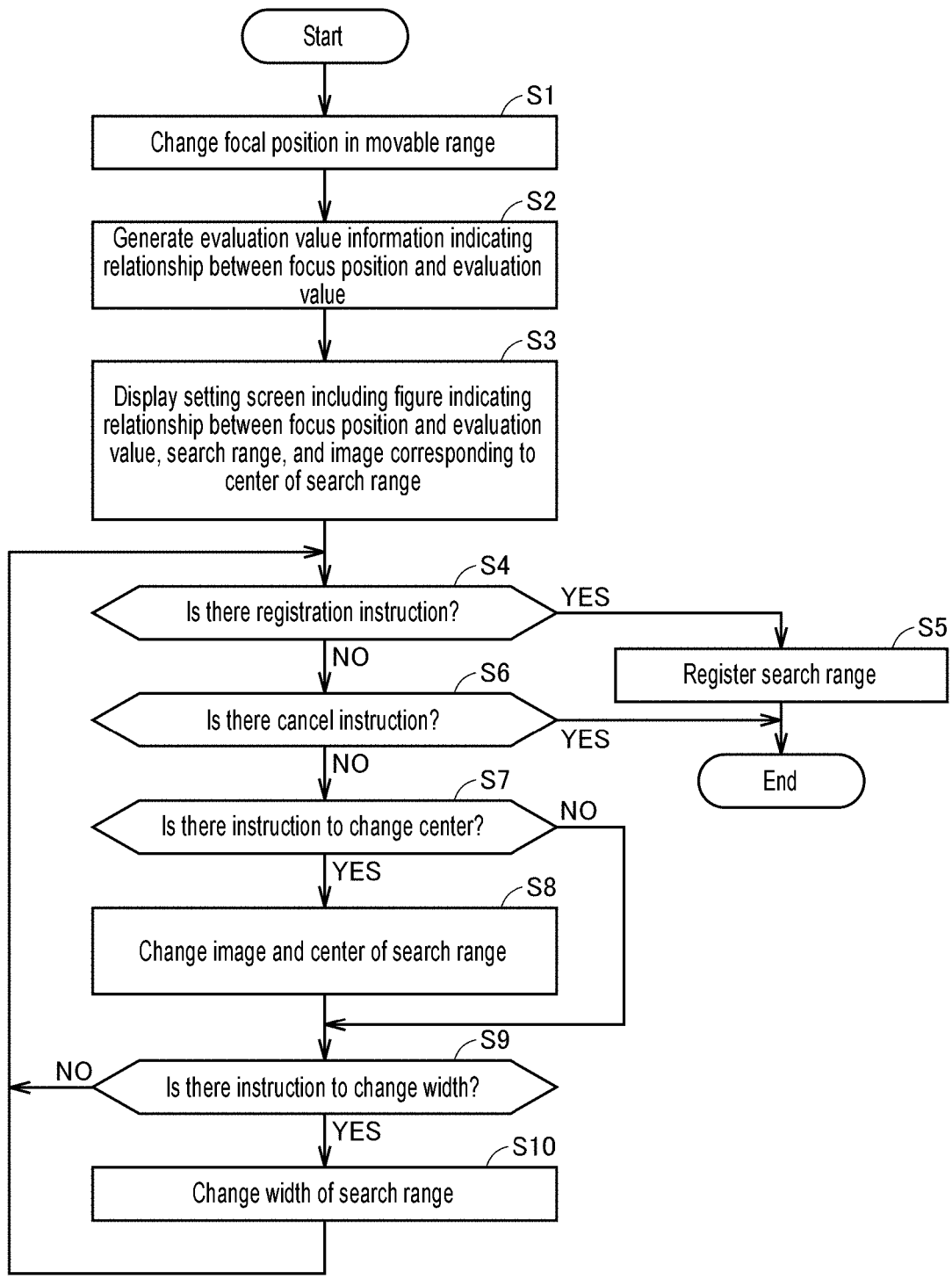
FIG. 9 is a flowchart illustrating an example of a flow of a process of setting a search range.

FIG. 9 is a flowchart illustrating an example of a flow of a process of setting the search range.

The worker inputs a search range setting instruction in a state in which a sample of the workpiece W is placed on the stage 90 (see FIG. 1). When the image processing device 20 receives the search range setting instruction, the image processing device 20 outputs the setting mode imaging instruction to the imaging device 10. Accordingly, in the imaging device 10, the focal position F of the lens module 12 changes in the entire movable range Ra (step S1).

Then, in the imaging device 10, evaluation value information in which each focal position in the movable range Ra is associated with the evaluation value is generated (step S2).

The image processing device 20 acquires the evaluation value information generated by the imaging device 10 and causes the display device 50 to display the setting screen 51 as illustrated in FIG. 8 based on the acquired evaluation value information (step S3). That is, the image processing device 20 causes the display device 50 to display the setting screen 51 including the line graph 53 indicating the relationship between the focal position and the evaluation value, the search range, and the image 54 corresponding to the center of the search range. The search range is indicated by the point 56a, the perpendicular line 56b, and the dotted lines 58 and 59, which are displayed to be superimposed on the line graph 53. The point 56a corresponds to the center of the search range. Therefore, the image 54 is indicated by the image data when the focal position of the lens module 12 has been adjusted to the designated position corresponding to the point 56a.

The image processing device 20 determines whether or not a search range registration instruction is input to the input device 40 (step S4). The image processing device 20 determines that the search range registration instruction is input by the OK button 60 included in the setting screen 51 being operated.

When the search range registration instruction is input (YES in step S4), the image processing device 20 generates the search range information indicating the search range set on the setting screen 51, and transmits the generated search range information to the imaging device 10. Accordingly, a new search range is registered in the imaging device 10 (step S5). After step S5, the search range setting process ends.

When the search range registration instruction is not input (NO in step S4), the image processing device 20 determines whether or not an instruction to cancel the setting of the search range is input to the input device 40 (step S6). The image processing device 20 determines that the instruction to cancel the setting of the search range has been input by the cancel button 61 included in the setting screen 51 being operated. When the cancel instruction has been input (YES in step S6), the process of setting the search range ends.

When the cancel instruction is not input (NO in step S6), the image processing device 20 determines whether or not an instruction to change the center of the search range has been input to the input device 40 (step S7). The image processing device 20 determines that the instruction to change the center of the search range has been input by the knob 55 included in the setting screen 51 being operated.

When instruction to change the center of the search range has been input (YES in step S7), the image processing device 20 updates the search range on the setting screen 51 and updates the image displayed in the area 52b (step S8). Specifically, the image processing device 20 changes the positions of the point 56a, the perpendicular line 56b, and the dotted lines 58 and 59 in response to the operation of the knob 55. Further, the image processing device 20 acquires, from the imaging device 10, the image data when the focal position of the lens module 12 has been adjusted to the designated position corresponding to the updated point 56a, and an image 54 indicated by the acquired image data is displayed in the area 52b.

When the instruction to change the center of the search range is not input (NO in step S7), the image processing device 20 determines whether or not an instruction to change the width of the search range has been input to the input device 40 (step S9). The image processing device 20 determines that the instruction to change the width of the search range has been input by the knob 57 included in the setting screen 51 being operated.

When the instruction to change the width of the search range is input (YES in step S9), the image processing device 20 updates the search range on the setting screen 51 (step S10). Specifically, the image processing device 20 changes the positions of the dotted lines 58 and 59 in response to the operation of the knob 57. After step S10, the process of setting the search range returns to step S4.

<F. Operation and Effects>

As described above, the imaging system 1 includes the lens module 12, the imaging element 13, the calculation part 16a, the focus controller 16b, the input device 40, the setting part 25, and the display device 50. The focal position F of the lens module 12 is variable in the predetermined movable range Ra. The imaging element 13 generates the image signal by receiving light from the workpiece W via the lens module 12. The calculation part 16a calculates the evaluation value indicating the in-focus degree based on the image signal. The focus controller 16b searches for the focal position (the in-focus position) at which the workpiece W is in focus based on the evaluation value. The setting part 25 sets the search range of the focus controller 16b from the movable range Ra according to the input to the input device 40. The setting part 25 supports the input of the search range to the input device 40 by causing the line graph 53 and the image 54 to be displayed on the display device 50. The line graph 53 shows the relationship between the focal position F of the lens module 12 and the evaluation value. The image 54 is shown by an image signal when the focal position F of the lens module 12 is adjusted to the designated position on the line graph 53.

According to the embodiment, the worker can confirm the image 54 when the focal position F of the lens module 12 is adjusted to the position by designating the position on the line graph 53, such that the worker can easily select a focal position at which the inspection target location of the workpiece W is in focus, from the line graph 53. Further, the worker can set the search range so that a plurality of focal positions at which the evaluation value is maximized is not included, while confirming the line graph 53. As a result, it is possible to avoid the in-focus position to be searched for becoming unstable. Thus, the worker can set the search range for stably acquiring the image which is in focus at the inspection target location of the workpiece W by receiving the support of the setting part 25. As a result, it is possible to cause the inspection target location of the workpiece W to be stably in focus.

<G. First Modification Example of Setting Screen>

Figure 10:
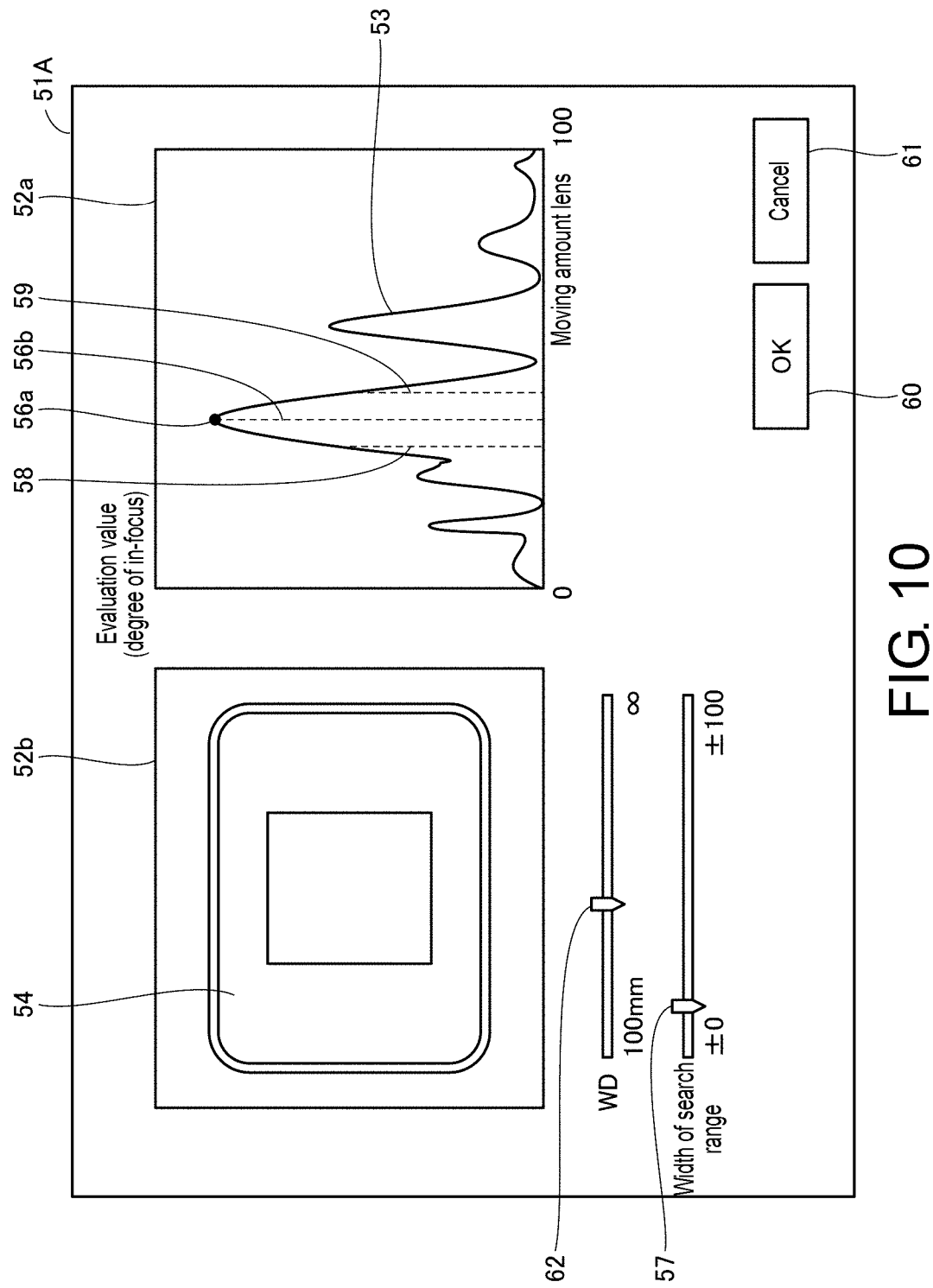
FIG. 10 is a diagram illustrating a first modification example of a search range setting screen.

FIG. 10 is a diagram illustrating a first modification example of the search range setting screen. A setting screen 51A of the first modification example illustrated in FIG. 10 is different from the setting screen 51 illustrated in FIG. 8 in that the setting screen 51A includes a knob 62 instead of the knob 55.

The knob 62 indicates a distance (working distance (WD)) between the lens module 12 and the inspection target location of the workpiece W. The setting part 25 receives an input of the distance between the lens module 12 and the inspection target location of the workpiece W in response to an operation with respect to the knob 62.

There is a case in which the worker can recognize the distance between the lens module 12 and the inspection target location of the workpiece W based on design data of the workpiece W or the like. In such a case, the worker operates the knob 62 to input the distance between the lens module 12 and the inspection target location of the workpiece W. The setting part 25 changes the position of the point 56a on the line graph 53 according to the input distance. Specifically, the setting part 25 changes the point 56a to a position of the moving amount of the lens 12a corresponding to the focal position when a location the distance away from the lens module 12 is in focus. The focal position when the location the distance away from the lens module 12 is in focus is specified based on Equation (1) above.

According to the setting screen 51A according to the first modification example, the worker can easily designate the position of the point 56a corresponding to the focal position when the inspection target location of the workpiece W is in focus.

In the example illustrated in FIG. 10, a horizontal axis of the line graph 53 is the moving amount of the lens 12a. However, the horizontal axis of the line graph 53 may be the distance (WD) between the lens module 12 and the inspection target location of the workpiece W, similar to the knob 62. Similarly, a unit of the knob 57 may be according to the distance (WD) between the lens module 12 and the inspection target location of the workpiece W, similar to the knob 62.

<H. Second Modification Example of Setting Screen>

Figure 11:
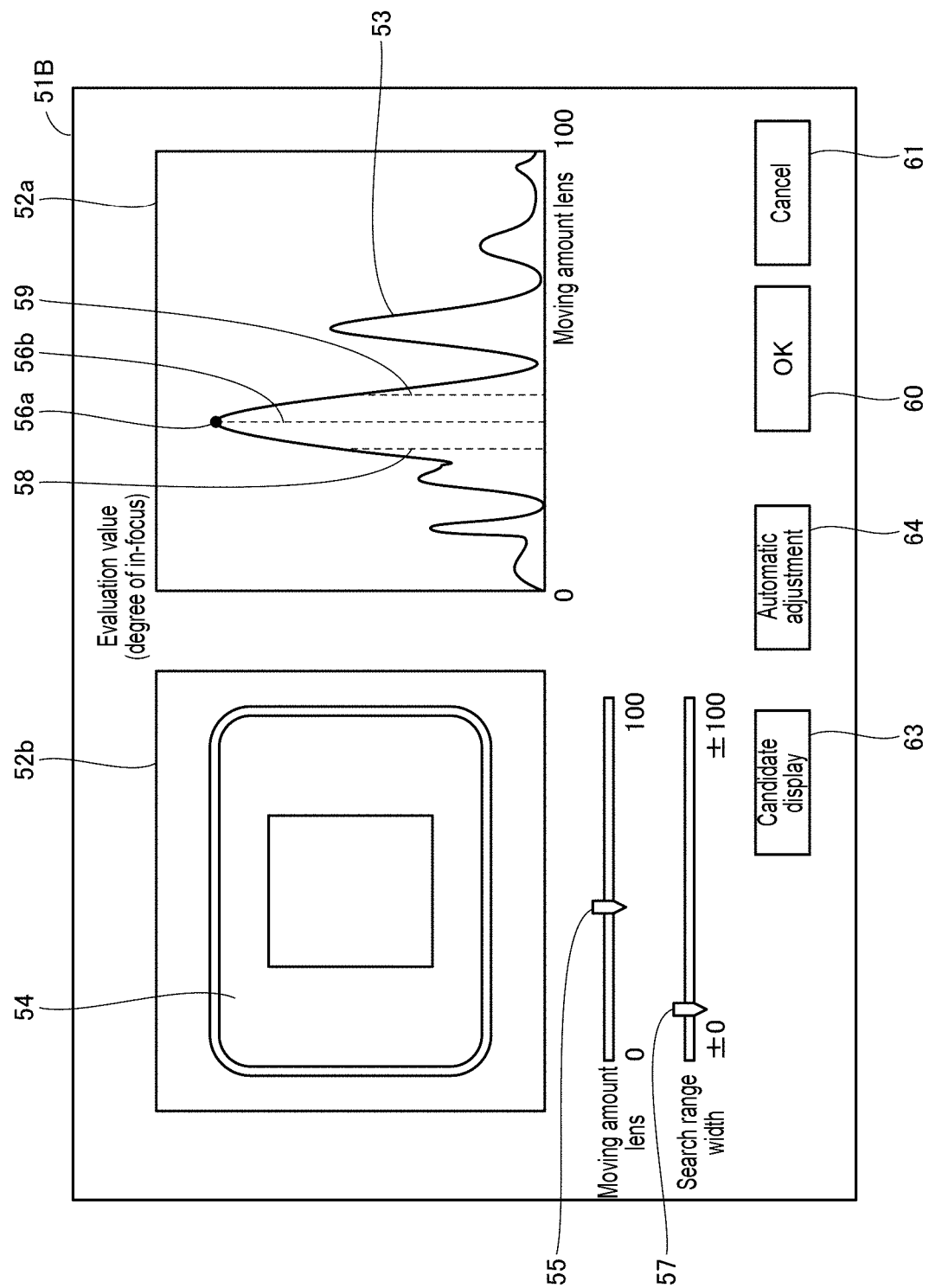
FIG. 11 is a diagram illustrating a second modification example of the search range setting screen.

FIG. 11 is a diagram illustrating a second modification example of the search range setting screen. A setting screen 51B of the second modification example illustrated in FIG. 11 is different from the setting screen 51 illustrated in FIG. 8 in that the setting screen 51B includes a candidate display button 63 and an automatic adjustment button 64.

The candidate display button 63 is a button for causing the search range candidate to be displayed. When the candidate display button 63 is operated, the setting part 25 extracts, as the search range candidate, a range including the focal position at which the evaluation value is maximized. Specifically, the setting part 25 extracts the maximum point from the line graph 53. The setting part 25 determines the search range candidate around the one extracted maximum point. In this case, the setting part 25 may determine twice a difference between the amounts of movement of the lens 12a at the one extracted maximum point and a minimum point closest to the maximum point as a width of the search range candidate. Accordingly, only one maximum point is included in the search range candidate.

When a plurality of maximum points is included in the line graph 53, the setting part 25 may determine search range candidate corresponding to each of the plurality of maximum points. Alternatively, the setting part 25 may determine a search range candidate corresponding to each of the maximum points having a predetermined number of upper evaluation values among the plurality of maximum points. The setting part 25 causes the display device 50 to display the search range candidate selected from among the plurality of determined search range candidates.

Figure 12:
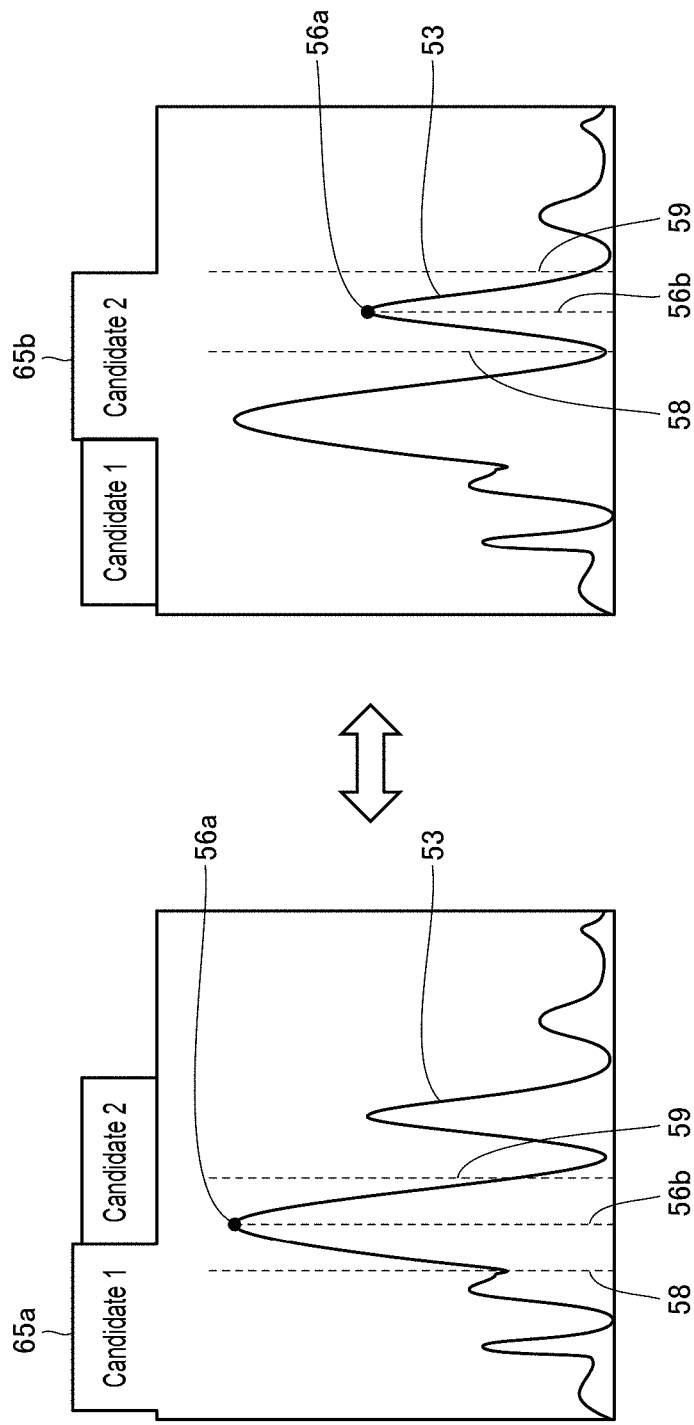
FIGS. 12A and 12B are diagrams illustrating an example of search range candidates displayed on a display device.

FIGS. 12(A) and 12(B) are diagrams illustrating examples of the search range candidates displayed on the display device. FIG. 12A illustrates a search range candidate corresponding to maximum points at which the evaluation value is greatest. FIG. 12B illustrates a search range candidate corresponding to maximum points at which the evaluation value is second greatest. The worker switches the search range candidate by operating tabs 65a and 65b.

When the search range candidate is displayed, the maximum point at the center of the search range candidate is set as the point 56a. Therefore, an image corresponding to the maximum point set as the point 56a is displayed in the area 52b of the setting screen 51B.

By the candidate display button 63 being provided, the worker can easily set the search range from among the search range candidates. Further, the worker may operate the knob 57 to adjust the width of the search range candidate.

Figure 13:
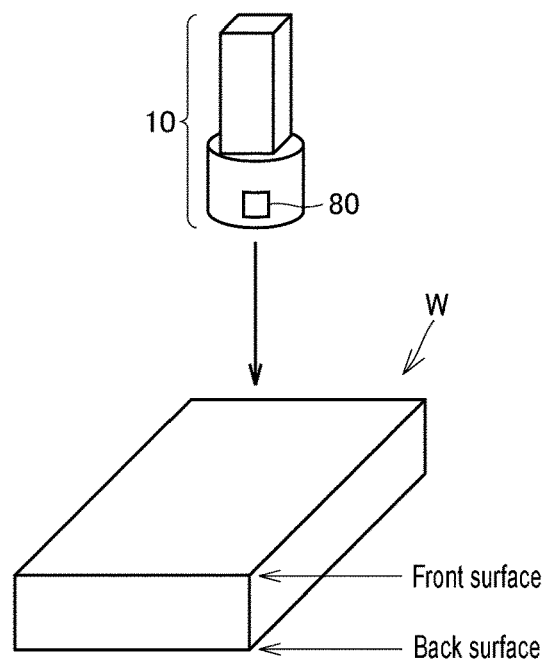
FIG. 13 is a diagram illustrating a configuration of an imaging system according to a second modification example.

FIG. 13 is a diagram illustrating a configuration of an imaging system according to the second modification example. As illustrated in FIG. 13, the imaging system according to the second modification example further includes a distance sensor 80 attached to the imaging device 10. The distance sensor 80 measures the distance between the lens module 12 and the workpiece W.

The automatic adjustment button 64 illustrated in FIG. 11 is a button for setting the point 56a based on the distance measured by the distance sensor 80.

When the automatic adjustment button 64 is operated, the setting part 25 acquires the distance measured by the distance sensor 80. The setting part 25 changes the position of the point 56a on the line graph 53 according to the acquired distance. Specifically, the setting part 25 changes the point 56a to the position of the moving amount of the lens 12a corresponding to the focal position when a location the distance away from the lens module 12 is in focus. The focal position when the location the distance away from the lens module 12 is in focus is specified based on Equation (1) above.

By the automatic adjustment button 64 being set, the worker can easily designate the point 56a corresponding to the focal position when the workpiece W is in focus.

The setting screen 51B illustrated in FIG. 11 includes both the candidate display button 63 and the automatic adjustment button 64. However, the setting screen 51B may include only one of the candidate display button 63 and the automatic adjustment button 64.

<I. Other Modification Examples>

The setting part 25 may determine a search range to be registered in the imaging device 10 by adjusting a plurality of search ranges respectively set for a plurality of samples of the workpiece W. For example, the setting part 25 may determine a range from an average value of lower limits of the plurality of search ranges to an average value of upper limits as the search range to be registered in the imaging device 10. Alternatively, the setting part 25 may determine a range in which the plurality of search ranges overlaps as the search range to be registered in the imaging device 10. Accordingly, the setting part 25 can register the search range in which an individual difference between the workpieces W has been taken into consideration in the imaging device 10.

Alternatively, the setting part 25 may cause line graphs respectively obtained for the plurality of samples of the workpiece W to be displayed in the area 52a in a superimposed manner. In this case, the image processing device 20 may acquire the evaluation value information corresponding to each of a plurality of samples.

Figure 14:
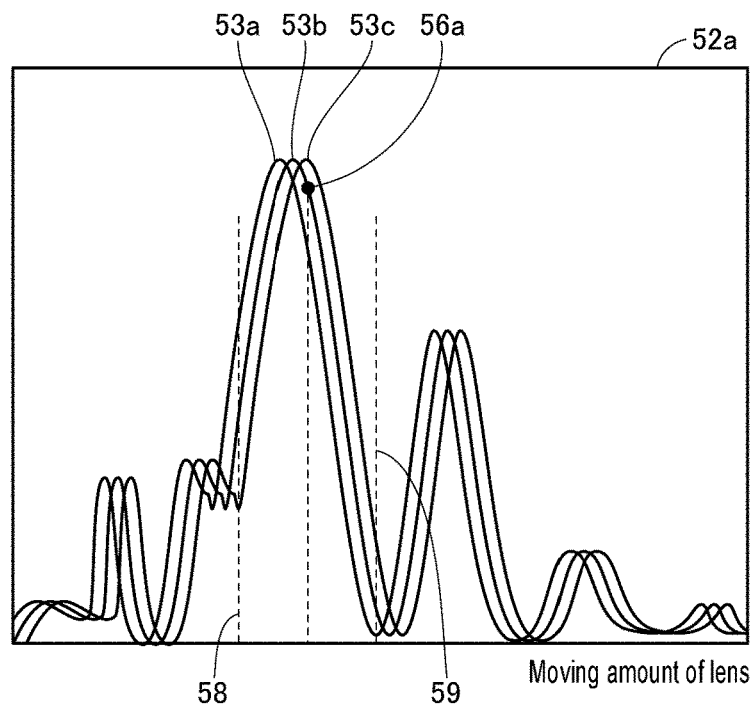
FIG. 14 is a diagram illustrating an example of an area 52*b* of a setting screen according to a third modification example.

FIG. 14 is a diagram illustrating an example of an area 52a of a setting screen according to a third modification example. As illustrated in FIG. 14, three line graphs 53a to 53c respectively corresponding to three samples are displayed in the area 52a in a superimposed manner. Accordingly, the worker can set the search range in consideration of an individual difference between workpieces W.

In the above description, each time the position of the point 56a is changed, the setting part 25 causes the manual focus mode imaging instruction to be output from the command generation part 21, and causes the image 54 indicated by the image data corresponding to the changed point 56a to be displayed in the area 52b. However, when the imaging device 10 receives the setting mode imaging instruction, the imaging device 10 may generate image information in which each focal position in the movable range is associated with the image data, and transmit the image information to the image processing device 20 together with the evaluation value information. Accordingly, the image processing device 20 may read the image data corresponding to the focal position (the designated position) designated by the point 56a from among the pieces of image information, and cause the image indicated by the read image data to be displayed in the area 52b.

When a plurality of line graphs is displayed as illustrated in FIG. 14, the worker may designate the point 56a on the line graph arbitrarily selected from the plurality of line graphs. The setting part 25 specifies image information corresponding to the selected line graph. The setting part 25 may read the image data corresponding to the point 56a from the specified image information, and cause the image indicated by the read image data to be displayed in the area 52b.

The setting screen of the example illustrated in FIG. 8 is displayed in the imaging system in which the lens module 12 includes the lens 12a of the example illustrated in FIG. 4. A line graph indicating a relationship between the magnitudes of the voltages Va and Vb correlated with the focal position of the lens module 12 and the evaluation value may be displayed on the setting screen displayed in the imaging system in which the lens module 12 includes the lens 12a of the example illustrated in FIG. 5.

In the above example, a line graph is displayed as the figure indicating the relationship between the focal position of the lens module 12 and the evaluation value. However, the figure indicating the relationship between the focal position of the lens module 12 and the evaluation value is not limited to the line graph, and the figure may be various graphs other than the line graph. Alternatively, in the figure indicating the relationship between the focal position of the lens module 12 and the evaluation value, a magnitude of the evaluation value may be represented by at least one of chromaticity, saturation and lightness.

In the above example, the width of the search range is set by the knob 57. That is, both the upper limit and the lower limit of the search range are simultaneously set by the knob 57. However, the setting screen may include a knob for setting the upper limit of the search range and a knob for setting the lower limit of the search range. Accordingly, the worker can set the upper limit and the lower limit of the search range individually.

3. Supplements I

As described above, the embodiments and the modification examples include the following disclosures.

(Configuration 1)

An imaging system (1) including:

an optical system (12) of which a focal position is variable in a predetermined range;

an imaging device (13) that generates an image signal by receiving light from a subject (W) via the optical system (12);

a calculation part (16a) that calculates an evaluation value indicating an in-focus degree based on the image signal;

an autofocus part (16b) that searches for a focal position at which the subject is in focus based on the evaluation value;

an input device (40);

a setting part (25, 210) that sets a search range of the autofocus part (16b) in the predetermined range according to an input to the input device (40); and a display device (50), wherein the setting part (25, 210) supports an input of the search range to the input device (40) by causing the display device (50) to display a figure indicating a relationship between a focal position of the optical system (12) and the evaluation value, and an image indicated by the image signal when the focal position of the optical system (12) has been adjusted to a designated position on the figure.

(Configuration 2)

The imaging system (1) according to configuration 1, wherein the input device (40) is able to receive an input of a distance between the optical system (12) and the subject (W), and when the input device (40) receives the input of the distance, the setting part (25, 210) sets a focal position when a surface of the subject (W) separated away from the optical system (12) by the distance is in focus, as the designated position.

(Configuration 3)

The imaging system (1) according to configuration 1, further including:

a sensor (80) that measures a distance between the optical system (12) and the subject (W), wherein the input device (40) is able to receive an instruction to set the designated position based on the distance measured by the sensor (80), and when the input device (40) receives the instruction, the setting part (25, 210) sets a focal position when a surface of the subject (W) separated away from the optical system (12) by the distance measured by the sensor is in focus, as the designated position.

(Configuration 4)

The imaging system (1) according to configuration 1, wherein the input device (40) is able to receive an instruction to display search range candidates for the search range, when the input device (40) receives the instruction, the setting part (25, 210) extracts at least one search range candidate from the figure, and sets one search range candidate selected from among the at least one search range candidate extracted by the setting part, as the search range, and the at least one search range candidate is a range including a focal position at which the evaluation value is a maximum value in the figure.

(Configuration 5)

The imaging system (1) according to configuration 4, wherein the figure includes a plurality of focal positions at which the evaluation value is a maximum value, and the setting part (25, 210) extracts a plurality of search range candidates respectively corresponding to the plurality of focal positions as the at least one search range candidate.

(Configuration 6)

The imaging system (1) according to configuration 1, wherein the setting part (25, 210) superimposes and displays the figures on the display device (50), and the figures are obtained respectively for a plurality of samples of the subject (W).

(Configuration 7)

A setting device (20) that is used in the imaging system (1) according to any one of configurations 1 to 6, the setting device (20) including the setting part (25, 210).

4. Supplements II

According to an embodiment of the disclosure, an imaging system includes an optical system, an imaging element, a calculation part, an autofocus part, an input device, a setting part, and a display device. The focal position of the optical system is variable in a predetermined range. The imaging element generates an image signal by receiving light from a subject via the optical system. The calculation part calculates an evaluation value indicating an in-focus degree based on the image signal. The autofocus part searches for a focal position at which the subject is in-focus based on the evaluation value. The setting part sets a search range of the autofocus part in the predetermined range according to an input to the input device. The setting part supports an input of the search range to the input device by causing the display device to display a figure indicating a relationship between the focal position of the optical system and the evaluation value, and an image indicated by the image signal when the focal position of the optical system has been adjusted to a position designated on the figure.

According to the disclosure, the worker can confirm the image when the focal position of the optical system has been adjusted to the position on the figure by designating the position on the figure. Accordingly, the worker can easily select a focal position at which a desired location of the subject is in focus in the figure. Further, the worker can set the search range so that a plurality of focal positions at which the evaluation value is maximized is not included while confirming the figure. As a result, it is possible to avoid the in-focus position to be searched for becoming unstable. From the above, the worker can set a search range for stably acquiring an image in which the desired location on the subject is in focus by receiving the support of the setting part. As a result, it is possible to cause the desired location on the subject to be stably in focus.

In the above disclosure, the input device is able to receive an input of a distance between the optical system and the subject. When the input device receives an input of the distance, the setting part sets a focal position at which a surface of the subject separated away from the optical system by the distance is in focus, as the designated position.

According to the disclosure, when the worker recognizes the distance between the optical system and the subject, the worker can easily designate the position corresponding to the focal position when the surface of the subject this distance away from the optical system is in focus at the figure by inputting the distance to the input device.

In the above disclosure, the imaging system further includes a sensor that measures a distance between the optical system and the subject. The input device is able to receive an instruction to set the designated position based on the distance measured by the sensor. When the input device receives the instruction, the setting part sets a focal position when a surface of the subject separated away from the optical system by the distance measured by the sensor is in focus, as the designated position.

According to this disclosure, the worker can easily designate the position corresponding to the focal position when a position the distance measured by the sensor away from the optical system is in focus at the figure.

In the above disclosure, the input device is able to receive an instruction to display search range candidates for the search range. When the input device receives the instruction, the setting part extracts at least one search range candidate from the figure and sets one search range candidate selected from among the at least one search range candidate extracted by the setting part, as the search range. The at least one search range candidate is a range including a focal position at which the evaluation value is a maximum value in the figure. According to the disclosure, the worker can easily set a search range candidate as the search range.

In the above disclosure, the figure includes a plurality of focal positions at which the evaluation value becomes maximum. The setting part extracts a plurality of search range candidates respectively corresponding to the plurality of focal positions as the at least one search range candidate. According to the disclosure, the worker can select one search range candidate corresponding to the desired location of the subject from among the plurality of search range candidates, and set the selected search range candidate as the search range.

In the above disclosure, the setting part superimposes and display the figures on the display device, and the figures are obtained respectively for a plurality of samples of the subject. According to this disclosure, the worker can set a search range in which individual differences between subjects are taken into consideration.

According to an embodiment of the disclosure, a setting device that is used in the imaging system includes the setting part. According to this disclosure, it is possible to cause a desired location on the subject to be stably in focus.

According to the disclosure, it is possible to cause a desired location on a subject to be stably in focus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging system, comprising:
an optical system of which a focal position is variable in a predetermined range;
an imaging element that generates an image signal by receiving light from a subject via the optical system;
a calculation part that calculates an evaluation value indicating an in-focus degree based on the image signal;
an autofocus part that searches for a focal position at which the subject is in focus based on the evaluation value;
an input device;
a setting part that sets a search range of the autofocus part in the predetermined range according to an input to the input device; and
a display device,
wherein the setting part supports an input of the search range to the input device by causing the display device to display a figure indicating a relationship between the focal position of the optical system and the evaluation value, and an image indicated by the image signal when the focal position of the optical system has been adjusted to a designated position on the figure.

2. The imaging system according to claim 1,
wherein the input device is able to receive an input of a distance between the optical system and the subject, and
when the input device receives the input of the distance, as the designated position, the setting part sets a focal position when a surface of the subject separated away from the optical system by the distance is in focus.

3. The imaging system according to claim 1, further comprising: a sensor that measures a distance between the optical system and the subject,
wherein the input device is able to receive an instruction to set the designated position based on the distance measured by the sensor, and
when the input device receives the instruction, as the designated position, the setting part sets a focal position when a surface of the subject separated away from the optical system by the distance measured by the sensor is in focus.

4. The imaging system according to claim 1,
wherein the input device is able to receive an instruction to display search range candidates for the search range,
when the input device receives the instruction, the setting part extracts at least one search range candidate from the figure, and sets one search range candidate selected from among the at least one search range candidate extracted by the setting part, as the search range, and the at least one search range candidate is a range including a focal position at which the evaluation value is a maximum value in the figure.

5. The imaging system according to claim 4,
wherein the figure includes a plurality of focal positions at which the evaluation value becomes maximum, and
the setting part extracts a plurality of search range candidates respectively corresponding to the plurality of focal positions as the at least one search range candidate.

6. The imaging system according to claim 1, wherein the setting part superimposes and displays the figures on the display device, and the figures are obtained respectively for a plurality of samples of the subject.

7. A setting device that is used in the imaging system according to claim 1, the setting device comprising the setting part.

8. The setting device according to claim 7,
wherein the input device is able to receive an input of a distance between the optical system and the subject, and
when the input device receives the input of the distance, as the designated position, the setting part sets a focal position when a surface of the subject separated away from the optical system by the distance is in focus.

9. The setting device according to claim 7, further comprising: a sensor that measures a distance between the optical system and the subject,
wherein the input device is able to receive an instruction to set the designated position based on the distance measured by the sensor, and
when the input device receives the instruction, as the designated position, the setting part sets a focal position when a surface of the subject separated away from the optical system by the distance measured by the sensor is in focus.

10. The setting device according to claim 7,
wherein the input device is able to receive an instruction to display search range candidates for the search range,
when the input device receives the instruction, the setting part extracts at least one search range candidate from the figure, and sets one search range candidate selected from among the at least one search range candidate extracted by the setting part, as the search range, and
the at least one search range candidate is a range including a focal position at which the evaluation value is a maximum value in the figure.

11. The setting device according to claim 10,
wherein the figure includes a plurality of focal positions at which the evaluation value becomes maximum, and
the setting part extracts a plurality of search range candidates respectively corresponding to the plurality of focal positions as the at least one search range candidate.

12. The setting device according to claim 7, wherein the setting part superimposes and displays the figures on the display device, and the figures are obtained respectively for a plurality of samples of the subject.

* * * * *